(12) United States Patent
Yamaguchi

(10) Patent No.: US 7,113,189 B2
(45) Date of Patent: Sep. 26, 2006

(54) RECORDING MEDIUM STORING 3D MODEL DEFORMATION PROGRAM, 3D MODEL DEFORMATION PROGRAM, 3D MODEL DEFORMATION METHOD AND VIDEO GAME DEVICE

(75) Inventor: Makoto Yamaguchi, Kobe (JP)

(73) Assignee: Konami Computer Entertainment Osaka, Inc., Osaka (JP)

(*) Notice: Subject to any disclaimer, the term of this patent is extended or adjusted under 35 U.S.C. 154(b) by 682 days.

(21) Appl. No.: 10/274,930

(22) Filed: Oct. 21, 2002

(65) Prior Publication Data

US 2003/0078098 A1   Apr. 24, 2003

(30) Foreign Application Priority Data

Oct. 24, 2001   (JP)   ............... 2001-326122

(51) Int. Cl.
*G06T 15/20* (2006.01)
(52) U.S. Cl. ............ 345/427; 345/473; 345/474; 345/475; 463/30
(58) Field of Classification Search ............ 345/473, 345/474, 419, 420, 427, 475; 463/30
See application file for complete search history.

(56) References Cited

U.S. PATENT DOCUMENTS

| 2001/0019333 A1 | 9/2001 | Sasaki |
| 2002/0167521 A1 | 11/2002 | Sasaki |

FOREIGN PATENT DOCUMENTS

| JP | 2001 209823 | 8/2001 |
| JP | 2002-092644 | 3/2002 |

OTHER PUBLICATIONS

Lewis J P et al: "Pose Space Deformation: A Unified Approach to Shape Interpolation and Skeleton-Driven Deformation" Computer Graphics. Siggraph 2000 Conference Proceedings. New Orleans, LA, Jul. 23-28, 2000, Computer Graphics Proceedings. Siggraph, New York, NY: ACM, US, Jul. 23, 2000, pp. 165-172, XP001003552 ISBN: 1-58113-208-5 "p. 167, left-hand column, paragraph 1-paragraph 3" "figure 1".

Kraaijvanger M: "The Evolution of 3D Game Models Part 1" Game Developer, Miller Freeman, San Francisco, CA, US, vol. 7, No. 10, Oct. 2000, pp. 29-33, XP001082925 ISSN: 1073-922X "p. 30, right-hand column, line 7-line 18" "p. 31, left-hand column, line 7-line 18" "p. 31, left-hand column, line 7-right-hand column, line 24" "figures 6,7".

"Famous 3D Animator" 'ONLINE!, 2000, XP002236850 Retrieved from the Internet: <URL: www.metamotion.com/software/motion-capture-software-famous-facial-2.htm> retrieved on Mar. 31, 2003! "the whole document".

*Primary Examiner*—Kimbinh T. Nguyen
(74) *Attorney, Agent, or Firm*—Jordan and Hamburg LLP

(57) ABSTRACT

A 3D model deformation program is provided capable of performing deformation processing of a 3D model using clusters in each drawing period in a video game. A CPU 21 finds for each cluster with which a vertex is associated the product of a weighting matrix expressing weightings representing the degree of association of a vertex in any desired frame with a cluster with which this vertex is associated, a co-ordinate transformation matrix for transforming the local co-ordinate system of the vertex in this frame to a world co-ordinate system, and an inverse transformation matrix which is the transformation matrix of the co-ordinate transformation matrix for transforming the local co-ordinate system of the vertex in the specified frame to the world co-ordinate system and finds an addition matrix by adding these products.

8 Claims, 6 Drawing Sheets

FIG.6

| FRAME 1 | M1wa | M1wb | ... |
| FRAME 2 | M2wa | M2wb | ... |
| ⋮ | ⋮ | ⋮ | |
| FRAME i | Miwa | Miwb | ... | i INDICATES THE
FRAME NUMBER
OF THE MOTION

FIG.7

| | SYMBOL | X CO-ORDINATE VALUE | Y CO-ORDINATE VALUE | Z CO-ORDINATE VALUE |
|---|---|---|---|---|
| VERTEX 1 | 0 | 5.332 | 2.221 | 1.567 |
| VERTEX2 | s+1 | 4.523 | 2.221 | -7.329 |
| ⋮ | ⋮ | ⋮ | ⋮ | ⋮ |
| VERTEXv | 10 | 112 | -15.651 | 24.334 |

V INDICATES THE
NUMBER OF THE
VERTEX OF THE
MODEL

FIG.8

| | |
|---|---|
| SYMBOL=0 | VERTEX OF WEIGHTING CLUSTER 0 (100%) |
| SYMBOL=1 | VERTEX OF WEIGHTING CLUSTER 1 (100%) |
| ⋮ | ⋮ |
| SYMBOL=s | VERTEX OF WEIGHTING CLUSTER s (100%) |
| SYMBOL=s+1 | VERTEX OF WEIGHTING CLUSTER 0 (30%), CLUSTER 1 (70%) |
| SYMBOL=s+2 | VERTEX OF WEIGHTING CLUSTER 0 (40%), CLUSTER 1 (60%) |
| ⋮ | ⋮ |
| SYMBOL=s+w | VERTEX OF WEIGHTING CLUSTER 0 (50%), CLUSTER s (50%) |

RECORDING MEDIUM STORING 3D MODEL DEFORMATION PROGRAM, 3D MODEL DEFORMATION PROGRAM, 3D MODEL DEFORMATION METHOD AND VIDEO GAME DEVICE

BACKGROUND OF THE INVENTION

1. Field of the Invention

The present invention relates to a video game device wherein a three-dimensional (hereinafter simply '3D') model constituted by a plurality of polygons having vertices associated with clusters for defining an object to be deformed is deformed in conformity with a drawing period from data of each of frames relating to a motion sequence, a 3D model deformation program employed in this video game device, a recording medium which stores the 3D model deformation program and a 3D model deformation method.

2. Description of the Related Art

Conventionally, the characters appearing in video games, such as for example characters modeled on human beings, are constituted by models comprising the various parts of the human body, such as head, upper arm, lower arm, hand, breast, waist, thighs, shins and feet, such models being formed by putting flesh on bones (skeleton) employed solely for the purpose of position setting. Specifically, these models are usually constituted by a plurality of polygons, the vertices of these polygons being regulated and managed as positional data from the central co-ordinates of the bones (i.e. reference co-ordinates constituting co-ordinates taken as reference for setting the bone positions). When a motion sequence of a character is to be displayed in a video game, the shape of the character in a frame at a given instant is found by calculating the positions of the bones in this frame and then calculating the positions of the vertices of the polygons which are attached to these bones.

However, when a character is represented using a skeleton as described above, the skeleton is set for each part of the human body and fine deformation processing of the character cannot be performed. For example, if a single model (skeleton) is set up for the head of a character, although overall operations such as inclining the head can be represented, detailed facial expressions of the character cannot be represented.

On the other hand, in the field of computer graphics, cluster deformation processing is performed in which clusters are associated with a plurality of vertices of the polygons constituting a three-dimensional (hereinafter simply '3D') model and the plurality of vertices associated with these clusters are moved by moving the cluster in question.

For example, facial animation tools such as the FAMOUSfaces animator (manufactured by Famous Technologies, Pty. Ltd.) are employed in the field of computer graphics. With this software, movement of vertices is achieved by setting up clusters in respect of groups obtained by grouping a plurality of vertices of a polygon or NURBS model constituting a 3D model, so that the vertices belonging to each cluster in question can be moved. Also, a single vertex can be associated with a plurality of clusters and weightings set up indicating the degree of association of the vertex in question with respect to each cluster; the vertex in question can then be moved in accordance with the weightings of the plurality of clusters.

In this way, in deformation processing of a 3D model using the above clusters, fine deformation of the 3D model can be achieved and complex human facial expressions etc can easily be created; however, when deformation processing of a 3D model is applied to a video game, it is necessary to draw the game image including that of the character appearing in the video game rapidly with every frame period.

However, in order to perform such drawing, an enormous amount of positional calculation in respect of the vertices of a large number of polygons must be performed so this calculation cannot be processed within the frame period; thus 3D model deformation processing using clusters as employed in the field of computer graphics cannot be directly applied to video games.

SUMMARY OF THE INVENTION

In view of the foregoing, an object of the present invention is to provide a 3D model deformation program, 3D model deformation method and video game device whereby 3D model deformation processing using clusters can be performed in each drawing period in a video game.

The present invention relates to a recording medium which stores a 3D model deformation program for deforming a 3D model constituted by a plurality of polygons having vertices associated with clusters for specifying an object to be deformed, in correspondence with the drawing period, from data of each frame relating to a motion sequence, said program causes a video game device to function as: matrix acquisition means that acquires a weighting matrix expressing weightings representing the degree of association of vertices in a certain frame (any desired frame) with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, the co-ordinate transformation matrix, the inverse co-ordinate transformation matrix and the world co-ordinates of the vertices in the base frame.

In the aforementioned invention, the 3D model deformation program for deforming a 3D model constituted by a plurality of polygons having vertices associated with clusters for specifying an object to be deformed, in correspondence with the drawing period, from data of each frame relating to a motion sequence, causes a video game device to function as: matrix acquisition means that acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, the co-ordinate transformation matrix, the inverse co-ordinate transformation matrix and the world co-ordinates of the vertices in the base frame.

That is, the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and finds the world co-ordinates of the vertices in the certain frame using the weighting matrix, co-ordinate transformation matrix, inverse co-ordinate transformation matrix and the world co-ordinates of the vertices in the base frame.

In this way, the world co-ordinates of a vertex in any desired frame can be found from the weighting matrix and co-ordinate transformation matrix in any desired frame (certain frame) and the inverse co-ordinate transformation matrix and the world co-ordinates of the vertex in a specified frame (base frame), so transformation processing of a 3D model using clusters can be performed at high speed. Also, since there is no need to store beforehand in prescribed memory the world co-ordinates of the vertices in each frame, the storage capacity of the memory can be reduced.

These and other objects, features, and advantages of the present invention will become more apparent upon reading the following detailed description along with the accompanying drawings.

BRIEF DESCRIPTION OF THE DRAWINGS

FIG. 6 is a view showing an example of memory content when a co-ordinate transformation matrix is held in a memory table when a plurality of clusters are employed;

FIG. 7 is a view showing an example of memory content when symbols specifying clusters participating in a co-ordinate transformation matrix and the co-ordinate values thereof are held beforehand in a memory table in correspondence with the vertices;

FIG. 8 is a view showing an example of memory content when the symbols shown in FIG. 7 and the weightings of the clusters associated therewith are held in a memory table.

DESCRIPTION OF THE PREFERRED EMBODIMENTS

Figure 1:
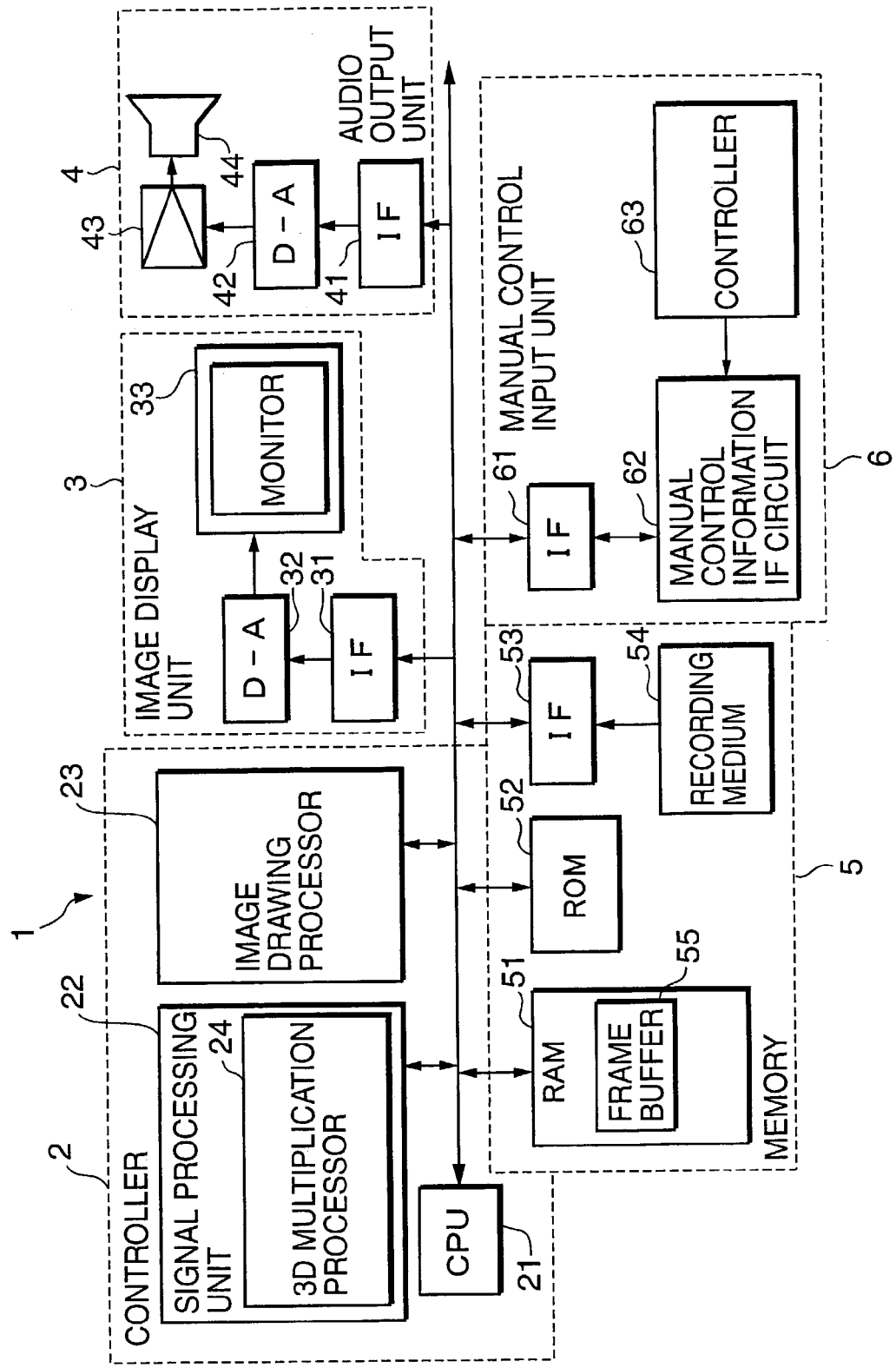
FIG. 1 is a block diagram illustrating the layout of a video game device according to an embodiment of the present invention.

A video game device according to an embodiment of the present invention is described below with reference to the drawings. FIG. 1 is a block diagram illustrating the layout of a video game device according to an embodiment of the present invention.

The video game device 1 shown in FIG. 1 includes a controller 2, image display unit 3, audio output unit 4, memory unit 5 and manual control input unit 6. The controller 2 includes a CPU (central processing unit) 21, signal processor 22 and image drawing processor 23. The signal processor 22 includes a three-dimensional multiplication processor 24. The image display unit 3 includes an interface (IF) circuit 31, a digital/analogue converter (D-A) 32 and a monitor 33. The audio output unit 4 includes an interface (IF) circuit 41, digital/analogue converter (D-A) 42, an amplification circuit 43 and a speaker 44. The memory unit 5 includes a RAM (random access memory) 51, ROM (read-only memory) 52, interface (IF) circuit 53 and computer-readable recording medium 54. The RAM 51 includes a frame buffer 55. The manual control input unit 6 includes an interface (IF) circuit 61, manual control information IF (interface) circuit 62 and controller 63.

In FIG. 1, the video game device 1 comprises a domestic game machine chassis comprising a controller 2 etc and a domestic television comprising a monitor 33 for displaying the game image and an amplification circuit 43 and speaker 44 for outputting game audio. The recording medium 54 is removably mounted in the domestic games machine chassis and is pre-recorded with a video game program etc comprising image data, voice data and program data. The recording medium 54 may be incorporated in the games machine chassis or may employ a ROM or the like on which is stored a video game program etc, a ROM cassette, CD-ROM, DVD-ROM or flexible disc etc.

The image data stored on the recording medium 54 includes image data of objects (static objects etc modeled on natural structural objects or artificial structures) and/or the image data of characters that execute motion, constituting a game image. The three-dimensional (hereinafter simply '3D') model representing this character, if for example the character is modeled on a human being, is constituted by models of the various parts such as the head, upper arm, lower arm, hand, breast, waist, thighs, shins and feet; the models of these parts are constituted by a plurality of polygons having respective vertices. Also, in prescribed portions of the 3D model such as for example the face portion, a plurality of clusters are set up; each cluster is associated with a plurality of polygons. The definition and the meaning of a term "cluster" can be found in a catalogue titled "FAMOUSfaces Animator V1.5" Version: Mar. 6, 2000 by Famous Technologies, Pty. Ltd. These clusters serve for defining the subjects of deformation, a deformation group being expressed comprising a set of vertices corresponding to the cluster in question; for example, if a cluster is defined as a specified point, this is used as a "cluster handle" and constitutes a reference point for deformation when deforming the vertices associated with this cluster.

The CPU 21 is connected through buses comprising an address bus, data bus and control bus with the RAM 51 that temporarily stores various types of data, the ROM 52 that stores programs such as the operating system, the interface circuits 31, 41, 53 and 61, the signal processor 22 and image drawing processor 23 and controls the various units in order to perform manual control operations and control actions within the games machine chassis. The recording medium 54 is of a removable type; in a condition with the recording medium 54 mounted in the games machine chassis, the CPU 21 writes the various types of data in the recording medium 54 to the RAM 51 either all at once or, if required, by successive reading.

The RAM 51 stores data that is read from the recording medium 54 and functions as the working area of the CPU 21 etc. The RAM 51 includes a frame buffer 55 that temporarily stores the image displayed on monitor 33; the frame buffer 55 has a storage capacity corresponding to the number of pixels constituting at least one screen.

The signal processor 22 performs position calculation of the object models such as character models or fixed object models in the 3D space and/or calculation of movement position of the virtual camera viewpoint (position) and also performs generation of audio data and operational processing etc. Processing to generate drawing data is performed by a 3D multiplication processor 24 that functions as an API (Application Programming Interface) within the signal processor 22. For this API, standard APIs such as "OPEN GL" or "DIRECT X", which comprise standard 3D (three-dimensional) functions, constituted by prescribed hardware and software can be employed.

The image drawing processor 23 performs the address designation of the storage positions corresponding to the pixels of the frame buffer 55 within the RAM 51 and read/write instructions (R/W) in respect of the RAM 51; using the calculation results from the signal processor 22, with the frame period, it repeatedly performs for each pixel processing to write the image data that is to be displayed on the monitor 33 to the frame buffer 55 (rendering processing and texture mapping processing etc).

The interface circuit 31 outputs to the digital/analogue converter 32 the image data that was written to the frame buffer 55 in the RAM 51. The digital/analogue converter 32 outputs a video signal to the monitor 33 by converting the image data from interface circuit 31 into an analogue signal, so that the prescribed game image is displayed on the monitor 33.

The digital/analogue converter 42 converts audio signals that are input through the interface circuit 41 from digital signals into analogue signals; a pre-main amplifier 43 amplifies the audio signals obtained by this transformation to analogue signals and applies these to the speaker 44. The audio data that is created in accordance with the game condition is subjected to write processing using a partial region of the RAM 51.

The controller 63 is provided with manual control members such as control buttons/control levers whereby manual control can be performed by a player; signals corresponding to the manual control operation of these manual control members are fed to the CPU 21 through a manual control information interface circuit 62 and interface circuit 61. Using its game progress control function, the CPU 21 advances the progress of the game by executing motions such as movements, actions or expressions intended by the player in respect of a character etc displayed on the monitor 33, in accordance with the manual control signals and video game program.

In this embodiment, the CPU 6 etc corresponds to matrix acquisition means and addition means and the 3D multiplication processor 24 corresponds to world co-ordinate calculation means. It should be noted that the video game device to which the present invention is applied is not particularly restricted to a domestic video game device 1 as shown in FIG. 1 but could likewise be applied to personal computers or workstations etc that function as a video game device by executing a video game program, or to commercial video game devices constructed with an integral monitor etc.

Figure 2:
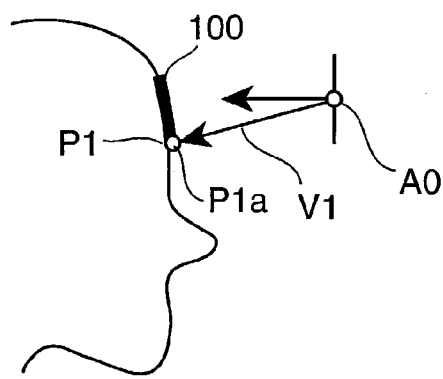
FIG. 2 is a diagram given in explanation of co-ordinate transformation processing of polygon vertices constituting a 3D model.

FIG. 2 is a diagram given in explanation of co-ordinate transformation processing of polygon vertices constituting a 3D model. The 3D model used to represent a character etc is defined using a local co-ordinate system and has co-ordinates serving as references in this local co-ordinate system. In FIG. 2, a 3D model is constituted by a model 100 (the thick line section in FIG. 2); the model 100 represents part of a character constituted by a plurality of polygons, for example part of the face.

Also, the reference point A0 is the deformation reference point of the cluster A that is associated with the model 100 and is positioned outside the model 100; the vertex P1 is a single vertex of a single polygon constituting the model 100; its position is defined using the offset value (component of the vector VI) from the reference point A0. The position P1$a$ in the local co-ordinate system of the vertex P1 can therefore be represented by the following expression (1).

$$P1a = (X1a, Y1a, Z1a) \tag{1}$$

If the co-ordinate transformation matrix employed in performing co-ordinate transformation of the reference point A0 on the local co-ordinate system of cluster A to the point W0 on the world co-ordinate system is designated as Mwa, the position P1$a$ of the vertex P1 on the local co-ordinates may be expressed as position P1$w$ on the world co-ordinates by using the following expression (2).

$$P1w = Mwa \times P1a \tag{2}$$

Regarding the co-ordinate transformation matrix Mwa, the method of taking parameters differs depending on the order of transformation from the local co-ordinate system in respect of the cluster A to the world co-ordinate system and the matrix expression also differs. The parameters and matrix expression are therefore set up for this co-ordinate transformation matrix Mwa in accordance with a predetermined transformation sequence.

For example, if it is assumed that transformation from the local co-ordinate system to the world co-ordinate system is performed in the transformation sequence: parallel movement along the X, Y and Z axes, rotary movement of the X, Y and Z axes and alteration of scale of the X, Y and Z axes, if the respective values of these are assumed to be: the amount of parallel movement along the X axis=Tx, the amount of parallel movement along the Y axis=Ty, the amount of parallel movement along the Z axis=Tz, the amount of rotary movement of the X axis=Rx, the amount of rotary movement of the Y axis=Ry and the amount of rotary movement of the Z axis=Rz, the X axis scale value=Sx, the Y axis scale value=Sy and the Z axis scale value=Sz, the co-ordinate transformation matrix Mwa (4 by 4 matrix) may be expressed by the following expression (3).

$$Mwa = |M1 \ M2 \ M3 \ M4| \tag{3}$$

where $$M1 = \begin{vmatrix} Sx \times \cos(Ry) \times \cos(Rz) \\ Sy \times (\sin(Rx) \times \sin(Ry) \times \cos(Rz) - \cos(Rx) \times \sin(Rz)) \\ Sz \times (\cos(Rx) \times \sin(Ry) \times \cos(Rz) + \sin(Rx) \times \sin(Rz)) \\ Tx \end{vmatrix}$$

$$M2 = \begin{vmatrix} Sx \times \cos(Ry) \times \sin(Rz) \\ Sy \times (\sin(Rx) \times \sin(Ry) \times \sin(Rz) + \cos(Rx) \times \cos(Rz)) \\ Sz \times (\cos(Rx) \times \sin(Ry) \times \sin(Rz) - \sin(Rx) \times \cos(Rz)) \\ Ty \end{vmatrix}$$

-continued $$M3 = \begin{vmatrix} (-1)Sx \times \sin(Ry) \\ Sy \times \sin(Rx) \times \cos(Ry) \\ Sz \times \cos(Rx) \times \cos(Ry) \\ Tz \end{vmatrix}$$

$$M4 = \begin{vmatrix} 0 \\ 0 \\ 0 \\ 1 \end{vmatrix}$$

Now the animation data employed for actuating or deforming a 3D model are specified as a motion sequence (movement) and each of these motions is specified as image data of a series of a plurality of frames. Drawing of the frames is performed with the prescribed frame period, for example, in the case of a video game, at intervals of 1/60 second; drawing processing is performed by transforming the co-ordinates of each vertex of the polygons corresponding to a cluster using the cluster co-ordinate transformation matrix Mwa for each frame found from expression (3) and creating the screen by linking up these transformed vertices in the world co-ordinates.

Figure 3:
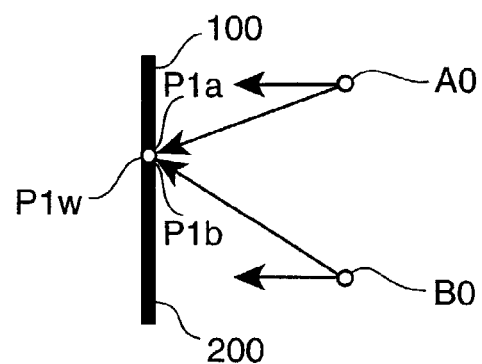
FIG. 3 is a diagram illustrating a frame in which two models are in a mutually straight-line positional relationship, given in explanation of realization of smooth linkage of models by the introduction of weighting.
Figure 4:
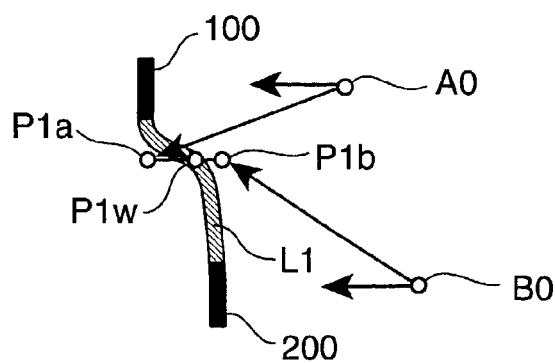
FIG. 4 is a diagram illustrating a frame in which one of the models is in a condition having moved towards the cluster reference point, given in explanation of realization of smooth linkage of models by the introduction of weighting.

FIG. 3 and FIG. 4 are diagrams given in explanation of realization of smooth linkage of models by the introduction of weighting; FIG. 3 illustrates a frame in which two models are in a mutually straight-line positional relationship and FIG. 4 illustrates a frame in which one of the models is in a condition having moved towards the cluster reference point.

In FIG. 3, the upper model 100 which is positioned at the upper part of the face (thick line portion in the lower part of FIG. 3) is associated with the cluster A, the cluster A having a reference point AO; the lower model 200 which is positioned in the lower part of the face (thick line portion in the lower part of FIG. 3) is associated with the cluster B, the cluster B having a reference point B0. Referring to a specific vertex P1*b* of a single polygon which is associated with this cluster B, this vertex is associated with the reference point B0 and is transformed to the vertex P1*w* on the lower model 200 by world co-ordinate transformation matrix Mwb. Also, in the condition of the frame of FIG. 3, this point P1*b* can be expressed as the point P1*a* when seen from the cluster A.

Let us now consider the case in which the drawing motion has changed from the frame condition shown in FIG. 3 to the frame condition shown in FIG. 4 in accordance with progress of the game i.e. the case in which the vertex associated with the cluster B is moved by movement of the reference point B0 of cluster B to outside the model (leftwards in FIG. 4). In this situation all of the polygon vertices associated with the cluster B are subjected to a coordinate transformation in the same way as the reference point B0 of the cluster B, so the vertex P1*b* in the lower part of the model 200 is moved to the position shown in FIG. 4 from the position shown in FIG. 3.

In contrast, if the reference point AO of the cluster A does not move, the vertex P1*a* of upper model 100 does not move from the position shown in FIG. 3. In this case, upper model 100 and lower model 200 constitute part of the surface of the face, so adjacent portions of upper model 100 and lower model 200 are constituted by smooth curves etc in accordance with the movement etc of facial muscles: for example, the shape of curve L1 shown in FIG. 4 (shaded portion in FIG. 4) is naturally produced.

In order to represent a natural condition of deformation the point P1*w* may be arranged to be influenced by both the cluster A and the cluster B; it may therefore be arranged to set a new point P1*w* by finding interior points of the line segment joining the point P1*a* and the point P1*b* in FIG. 4 such that the point P1*w* is positioned on curve L1, by setting the weightings with which these influences are received in association with the clusters A and B.

If the degree of the association with the cluster A of a given vertex is represented by weighting Ga (%) and the degree of association with the cluster B of this same vertex is represented by weighting Gb (%), the ratios ga (<1) and gb (<1) are respectively expressed by the following expression (4) to expression (7).

$$ga = Ga/(Ga + Gb) \quad (4)$$

$$Mga = \begin{vmatrix} ga & 0 & 0 & 0 \\ 0 & ga & 0 & 0 \\ 0 & 0 & ga & 0 \\ 0 & 0 & 0 & 1 \end{vmatrix} \quad (5)$$

$$gb = Gb/(Ga + Gb) \quad (6)$$

$$Mgb = \begin{vmatrix} gb & 0 & 0 & 0 \\ 0 & gb & 0 & 0 \\ 0 & 0 & gb & 0 \\ 0 & 0 & 0 & 1 \end{vmatrix} \quad (7)$$

It should be noted that Mga and Mgb are the ratios ga and gb expressed in matrix form.

Furthermore, if Mwa represents the co-ordinate transformation matrix for co-ordinate transformation of the cluster A from the local co-ordinate system to the world co-ordinate system and Mwb represents the co-ordinate transformation matrix for co-ordinate transformation of the cluster B from the local co-ordinate system to the world co-ordinate system, the point P1*w* is expressed by the following expression (8).

$$P1w = Mga \times Mwa \times P1a + Mgb \times Mwb \times P1b \quad (8)$$

Figure 5:
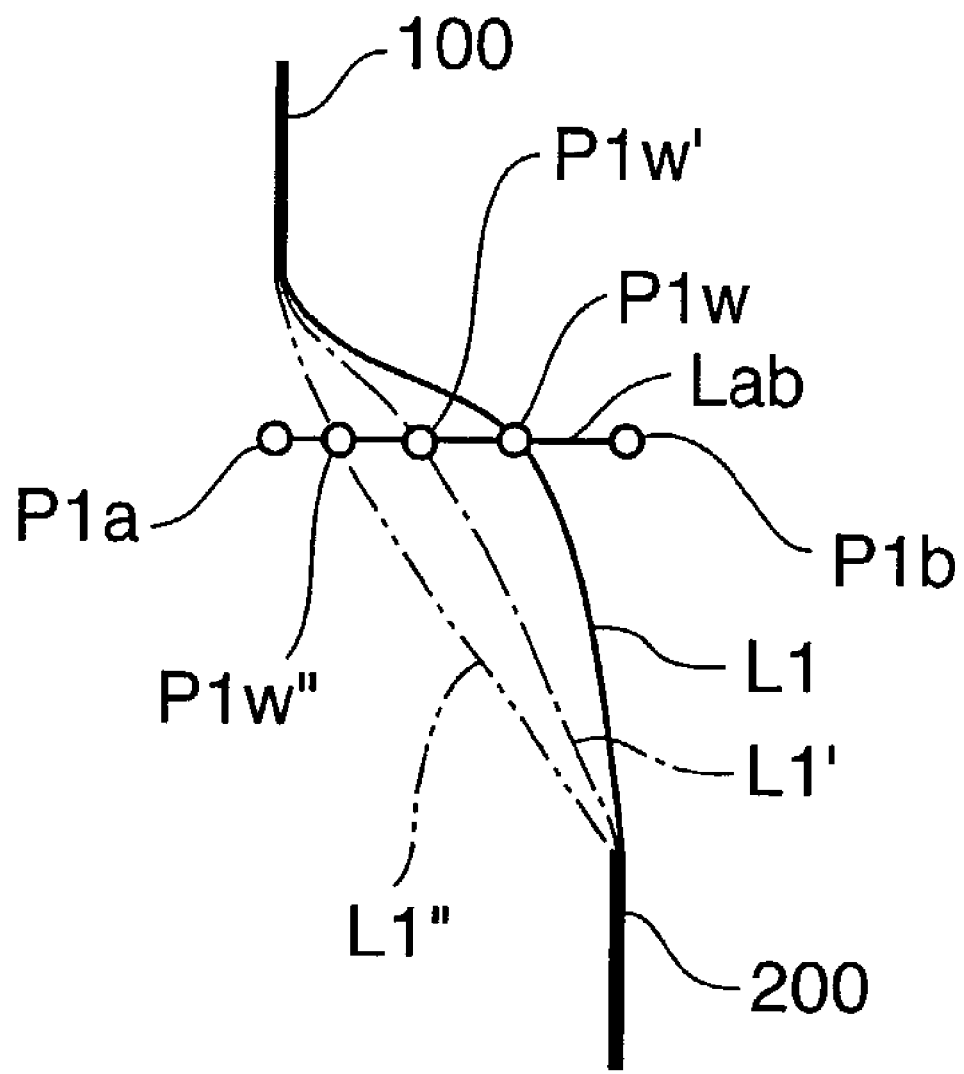
FIG. 5 is a diagram given in explanation of the tracks of lines of adjacent portions adjusted by weighting.

FIG. 5 is a diagram given in explanation of the tracks of the lines of adjacent portions, adjusted by weightings. If this processing is explained in image form, as shown in FIG. 5, in respect of the line segment Lab joining the point P1*a* and the point P1*b* when respectively associated with separate clusters A and B, regarding the values of the ratios ga and gb, if for example the ratio ga is made larger i.e. ratio gb is made small, the point P1*w* moves along the line segment Lab from the point P1*b* to the point P1*a* as indicated by the point P1*w'* and the point P1*w''*. In this way, the tracks (shapes) of the lines of the adjacent portions of the upper model 100 and the lower model 200 can be adjusted from the curve L1 to the curve L1' and the curve L1''.

In this way, by giving the vertex data of the polygons in each range weighting information corresponding to the clusters in prescribed ranges of the models, the shapes of the adjacent portions of the adjacent models 100 and 200 can be smoothly joined as shown in FIG. 5 so that a representation can be achieved in which smooth deformation is achieved between the models 100 and 200.

Next, a way in which speeding up of the co-ordinate transformation processing of the vertices of the polygons used in the clusters can be achieved will be described.

Smoother imaging can be produced by representation of the weightings of adjacent portions using expression (8) described above.

With a standard API such as "OPEN GL" or "DIRECT X" used in the signal processor 22, the product of the matrix and the co-ordinates of the respective vertices is employed for representing any desired point on the screen. Consequently, even though the API can achieve high-speed calculation of the first and second term respectively of expression (8), the results of these two calculations are added to obtain a point on the world co-ordinates by a structural portion (hardware or software) other than the aforesaid standard API and the vertex co-ordinates on the world co-ordinates which are obtained as a result must be transferred from this signal processor 22 to the image drawing processor 13 together with the unit vector for display purposes, so time is required for this to be done.

Furthermore, although, in the case of vertices that do not have a weighting i.e. that are not associated, co-ordinate transformation can be achieved simply by performing "matrix×vertex co-ordinates", in the case of vertices that do have a weighting i.e. that are associated, addition: "matrix×vertex co-ordinates"+"matrix×vertex co-ordinates" must be performed a number of times equal to the number of clusters with which the vertex is associated. Consequently, even if an independently created API is applied, it is still necessary to evaluate for each vertex whether or not there is a weighting and to execute different calculation processing in accordance with the result of this evaluation: this tends to slow down the transformation processing and so application to video games is difficult.

A way of speeding up transformation processing will therefore be described with reference to FIG. 3 and FIG. 4. The frame in FIG. 3 is taken as being frame 1 representing a field of motion and the co-ordinate transformation matrices Mwa, Mwb in frame 1 are defined as M1$wa$ and M1$wb$. Also, the frame in FIG. 4 is taken as being frame 2 representing the next field of motion and the co-ordinate transformation matrices Mwa, Mwb in frame 2 are defined as M2$wa$ and M2$wb$. The points P1$a$ and P1$b$ in frame 1 of FIG. 3 may then be found from expression (9).

$$P1w = M1wa \times P1a \quad (9)$$

$$P1w = M1wb \times P1b \quad (10)$$

Further, expression (9) and expression (10) can be transformed into expression (11) and expression (12) by calculating the inverse co-ordinate transformation matrices M1$wa^{-1}$ and M1$wb^{-1}$, which are the inverse matrices of the co-ordinate transformation matrices M1$wa$ and M1$wb$.

$$P1a = M1wa^{-1} \times P1w \quad (11)$$

$$P1b = M1wb^{-1} \times P1w \quad (12)$$

The point P1$a$ has the local co-ordinates with respect to the cluster A if the vertex P1 is associated only with the cluster A; the point P1$b$ has the local co-ordinates with respect to the cluster B if the vertex P1 is associated only with the cluster B.

The local co-ordinates of vertices that are associated with only a single cluster are fixed in all frames, so the points P1$a$ and P1$b$ in the frame of FIG. 3 correspond to points P1$a$, P1$b$ in the frame of FIG. 4; if these points are designated by P2$a$, P2$b$, the relationship of these two may be expressed by expression (13) and expression (14).

$$P2a = P1a \quad (13)$$

$$P2b = P1b \quad (14)$$

Substituting expression (13) and expression (14) into expression (11) and expression (12), respectively, the following expression (15) and expression (16) are obtained:

$$P2a = M1wa^{-1} \times P1w \quad (15)$$

$$P2b = M1wb^{-1} \times P1w \quad (16)$$

Consequently, if the point P1$w$ in the frame of FIG. 4 is designated as the point P2$w$ in the same way as in expression (8), the point P2$w$ is expressed by the following expression (17).

$$P2w = Mga \times M2wa \times P2a + Mgb \times M2wb \times P2b \quad (17)$$

Next, by substituting expression (15) and expression (16) into expression (17), P2$w$=Mga×M2$wa$×M1$wa^{-1}$×P1$w$+Mgb×M2$wb$×M1$wb^{-1}$×P1$w$ and the following expression (18) is obtained.

$$P2w = (Mga \times M2wa \times M1wa^{-1} + Mgb \times M2wb \times M1wb^{-1}) \times P1w \quad (18)$$

Here, the portion in brackets (Mga×M2$wa$×M1$wa^{-1}$+Mgb×M2$wb$×M1$wb^{-1}$) on the right-hand side of expression (18) can be expressed as a single matrix, so expression (18) becomes "matrix×vertex co-ordinates" and so can be calculated using only a standard API, as described above. Furthermore, the calculation can be achieved using only the world co-ordinates P1$w$ of a specified frame (in this case frame 1 of FIG. 3) as the co-ordinate data, so, in contrast with the case of expression (8), the amount of data can be reduced to that extent.

Regarding the data of the matrix portion (Mga×M2$wa$×M1$wa^{-1}$+Mgb×M2$wb$×M1$wb^{-1}$), a memory table is provided beforehand that respectively stores co-ordinate transformation matrices M1$wa$, M1$wb$, M2$wa$ and M2$wb$ defined as a motion sequence for each frame, so this can be found using the stored data.

FIG. 6 is a view showing an example of memory content when co-ordinate transformation matrices in the case where a plurality of clusters are employed are held in a memory table. As shown in FIG. 6, if for example a plurality of clusters a, b, . . . are employed, co-ordinate transformation matrices equal in number to the number of clusters a, b . . . are stored for each frame (1 to i) i.e. co-ordinate transformation matrices M1$wa$, M1$wb$, . . . , M2$wa$, M2$wb$, . . . Miwa, Miwb are stored in a memory table provided by the RAM 51 etc for each frame.

Next, increasing the efficiency of data compression and processing will be described. In the case of expression (18), there were two clusters associated with a vertex, but, in the models employed in video games, there is no restriction to two clusters and it is necessary to consider the existence of polygons associated with 1 to n clusters. Also, although, in expression (18), the data was based on (M1$w$, P1$w$), since the association between the clusters and vertices was calculated based on frame 1 shown in FIG. 3, since the fundamental frame need not necessarily be frame 1 of FIG. 3, hereinbelow this will be indicated by expression (19) as a general formula as below, replacing these by the basis: (M0$w$, P0$w$).

$$Pw = (\Sigma_{n=1 \text{ to } Ps}(Mg[n] \times Mw[n] \times M0w[n]^{-1})) \times P0w \quad (19)$$

where

"$\Sigma_{n=1 \text{ to } Ps}$" indicates a mathematical notation for summation when n is changed from 1 to Ps.

Pw is the vertex co-ordinates of the world co-ordinates in the frame being found, Ps is the number of clusters associated with the vertex being found, Mg[n] is the weighting matrix expressing the weighting of the cluster associated with the vertex in the frame being found, Mw[n] is the co-ordinate transformation matrix of the cluster associated with the vertex in the frame being found, M0w[n]$^{-1}$ is the fundamental inverse co-ordinate transformation matrix of the cluster of the vertex being found at the time point associated with the cluster and P0w are the world co-ordinates of the vertex being found at the time point associated with the cluster.

From expression (19), the transformation matrix (addition matrix) of the vertex being found at the time point of the frame being found is as follows.

$$\Sigma_{n=1 \text{ to } Ps}(Mg[n] \times Mw[n] \times M0w[n]^{-1}) \quad (20)$$

where "$\Sigma_{n=1 \text{ to } Ps}$" indicates a mathematical notation for summation when n is changed from 1 to Ps.

In the above, there is a very large quantity of data for each vertex, since the above transformation matrix (20) exists at each of all the vertices constituting the model. Also, since such a transformation matrix must be compiled for each vertex, the time required for this computation processing makes it impossible to keep up with the frame period.

Mw [1, 2, . . . , Ps] and M0w [1, 2, . . . , Ps] are the parameters relating to the clusters, so following of all the vertices can be achieved if the matrices of all of the clusters are available. Also, regarding the information for finding the transformation matrices that are characteristic of the vertices, the data for finding the matrices can be reduced by managing the identities of the clusters that are being used by cluster numbers (symbols) constituting identification information for specifying the cluster with which the vertex in question is associated, for each vertex and associating these with the combination of weightings Mg[n] therefor. Specifically, M0w [1, 2, . . . , Ps] are fixed by the model, so they can be made available as model data; Mw [1, 2, . . . , Ps] are co-ordinate transformation matrices of frame unit clusters and so can be made available as model frame data.

FIG. 7 is a view showing an example of memory content when symbols specifying the clusters participating in a transformation matrix and the co-ordinate values thereof are held beforehand in a memory table in correspondence with the vertices; FIG. 8 is a view showing an example of memory content when the weightings of the clusters associated therewith are held in a memory table in association with the symbols shown in FIG. 7.

As shown in FIG. 7 and FIG. 8, if symbols specifying the clusters contributing to the transformation matrices associated with each vertex and their co-ordinate values are stored in a memory table constituted by the RAM 51 etc and, in addition, the weightings of the associated clusters are stored in the memory table constituted by the RAM 51 etc in association with the stored symbols, memory capacity can be reduced compared with the case where the cluster weightings constituting the data for finding transformation matrices are stored directly in correspondence with the respective vertices.

The amount of data at each vertex can also be reduced by, when creating a model, restricting beforehand the types of combination of weightings of each of the vertices (i.e. setting these to various types) and managing these combinations using numbers (symbols), transformation matrix numbers (symbols) being allocated to each vertex. Furthermore, rapid calculation of vertex transformation can be achieved by calculating beforehand transformation matrices (20) for all of the combinations, prior to vertex transformation, these results being obtained beforehand (stored during the game period).

Figure 9:
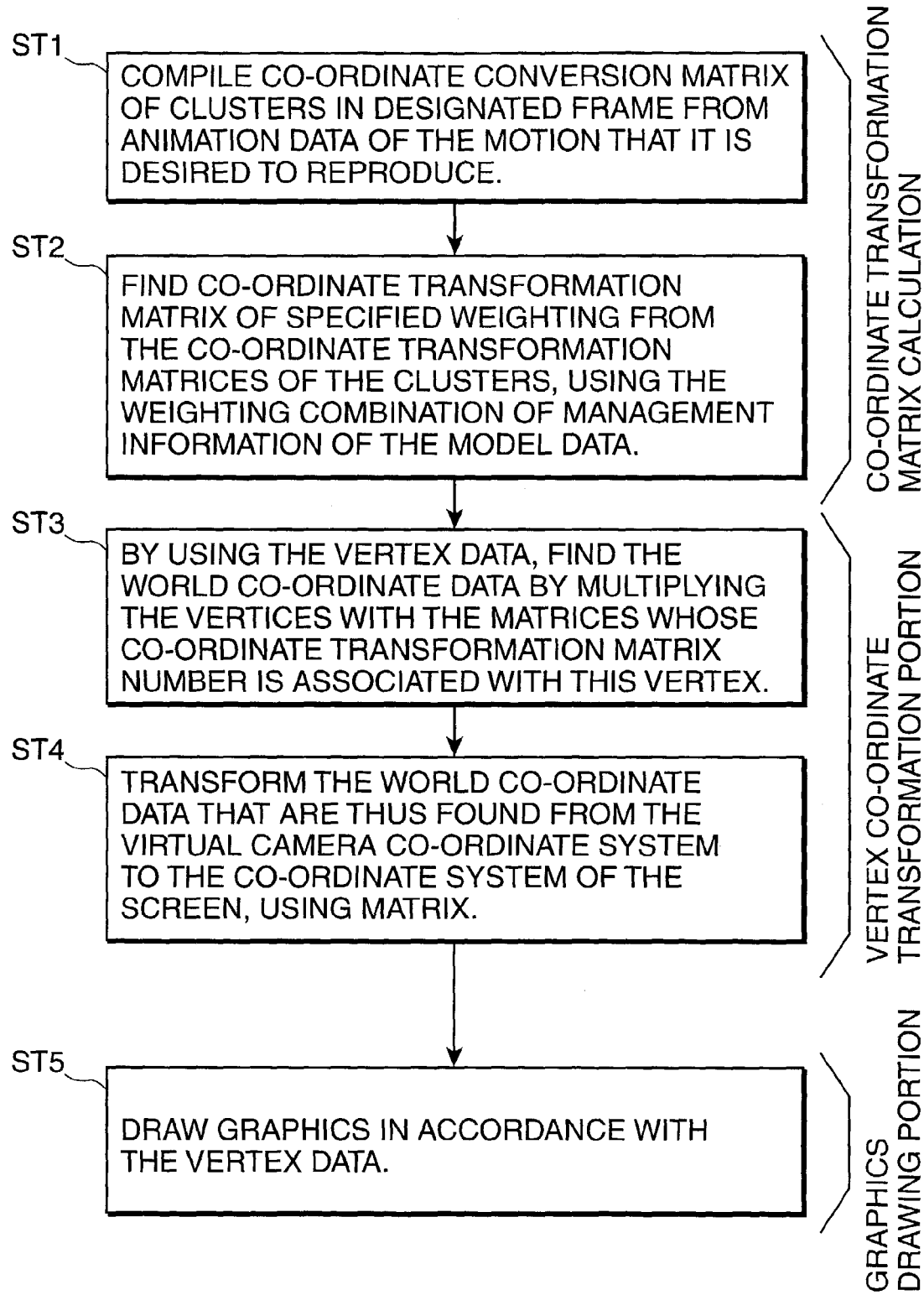
FIG. 9 is a flow chart showing 3D model deformation processing by a CPU etc when this model data is employed.

FIG. 9 is a flow chart showing 3D model deformation processing using the CPU 21 etc when model data as described above is employed.

First of all, co-ordinate transformation matrices of the clusters in the designated frame are compiled (step ST1) using animation data of the motion that it is desired to reproduce. Next, co-ordinate transformation matrices of the clusters whose weightings have been designated are found from the cluster co-ordinate transformation matrices, using the information regarding management of the combinations of model data weighting (for example the symbols indicated in FIG. 8) (step ST2).

Next, using the data possessed by the vertices, the world co-ordinate data is found (step ST3) by multiplying, using the 3D multiplication processor 24 etc, the respective vertices with the matrix designated by the number (symbol) of the co-ordinate transformation matrix associated with the vertex in question, and the world co-ordinate data that is thus found is transformed (step ST4) from the co-ordinate system of the virtual camera to the screen co-ordinate system using a prescribed matrix. Graphics drawing (writing to the frame buffer 55 of the RAM 51) in respect of image drawing processor 13 is then performed (step ST5), in accordance with the vertex data of the screen co-ordinate system that have been obtained.

The following modes of the present invention may be adopted.

(1) This embodiment is likewise applicable also to the normal vector data that is set for each vertex. Specifically, transformation of the normal vectors can also be achieved in the same way as in the case of the co-ordinate positions using expression (18) or expression (19) by utilizing weighted cluster co-ordinate transformation matrices and smoothness of joining can thereby be realized even in respect of the polygon faces.

(2) The model shapes obtained with this embodiment are not restricted to drawing but could also be applied for ascertaining abutment or contact with no feeling of disconformity with other objects while keeping the displayed image the same as in the conventional mode.

(3) While the model data employed in video games typically chiefly comprises polygon model data, the techniques illustrated in this embodiment could also be applied when forming a polygon model by finding a path model or a NURBS model.

(4) Although in this embodiment an example was illustrated in which the joining portions were made smooth by arranging the clusters outside the model, it would be possible to set up prescribed weightings associating polygon vertices constituting this model with internal clusters by arranging (defining) the clusters inside the model.

In summary, the one form of the present invention relates to a recording medium which stores a 3D model deformation program for deforming a 3D model constituted by a plurality of polygons having vertices associated with clusters for specifying an object to be deformed, in correspondence with the drawing period, from data of each frame relating to a motion sequence, said 3D model deformation program causes a video game device to function as: matrix acquisition means that acquires a weighting matrix expressing weightings representing the degree of association of vertices in a certain frame (arbitrary chosen frame or any desired frame) with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, the co-ordinate transformation matrix, the inverse co-ordinate transformation matrix and the world co-ordinates of the vertices in the base frame.

With the present invention as described in the above, the 3D model deformation program for deforming a 3D model constituted by a plurality of polygons having vertices associated with clusters for specifying an object to be deformed, in correspondence with the drawing period, from data of each frame relating to a motion sequence, causes a video game device to function as: matrix acquisition means that acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, the co-ordinate transformation matrix, the inverse co-ordinate transformation matrix and the world co-ordinates of the vertices in the base frame.

That is, the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and finds the world co-ordinates of the vertices in the certain frame using the weighting matrix, co-ordinate transformation matrix, inverse co-ordinate transformation matrix and the world co-ordinates of the vertices in the base frame.

In this way, the world co-ordinates of a vertex in any desired frame can be found from the weighting matrix and co-ordinate transformation matrix in any desired frame (certain frame) and the inverse co-ordinate transformation matrix and the world co-ordinates of the vertex in a specified frame (base frame), so transformation processing of a 3D model using clusters can be performed at high speed. Also, since there is no need to store beforehand in prescribed memory the world co-ordinates of the vertices in each frame, the storage capacity of the memory can be reduced. Thus, the deformation processing of a 3D model using clusters can be performed in each drawing period in a video game and memory storage capacity can be reduced.

In the aforementioned invention, the video game device can be further caused to function as addition means for finding an addition matrix obtained by finding the product of the weighting matrix, the co-ordinate transformation matrix and the inverse co-ordinate transformation matrix for each cluster with which a vertex is associated, and adding these products; and the world co-ordinate calculation means finds the world co-ordinates of a vertex in the certain frame from the product of the addition matrix and the world co-ordinates of the vertex in the base frame.

With the aforementioned features, the 3D model deformation program further causes the video game device to function as addition means for finding an addition matrix obtained by finding the product of the weighting matrix, co-ordinate transformation matrix and inverse co-ordinate transformation matrix for each cluster with which a vertex is associated, and adding these products; and the world co-ordinate calculation means finds the world co-ordinates of a vertex in the certain frame from the product of the addition matrix thus found and the world co-ordinates of the vertex in the base frame.

That is, the addition matrix is obtained by finding the product of the weighting matrix, co-ordinate transformation matrix and inverse co-ordinate transformation matrix for each cluster with which a vertex is associated, and adding these products that are obtained; and the world co-ordinates of a vertex in the certain frame are found from the product of the addition matrix thus found and the world co-ordinates of the vertex in the base frame.

In this way, the world co-ordinates of a vertex in any desired frame (a certain frame) can be found using a standard API (Application Programming Interface), so 3D model deformation processing can be performed at high speed. Accordingly, vertex world co-ordinates can be found in any desired frame solely by the product of an addition matrix and vertex co-ordinates, so 3D model deformation processing can be performed at high speed in each frame period using a standard API.

In the aforementioned invention, the base frame can be set as the first frame relating to a motion sequence.

With the above feature, the base frame is the first (initial) frame relating to a motion sequence, so the world co-ordinates of a vertex in all of the second and subsequent frames can be found from the world co-ordinates of the vertex in the base frame. Accordingly, the world co-ordinates of all of the vertices in the second and subsequent frames can be found from the world co-ordinates of the vertices in the first frame, so the need to store beforehand the world co-ordinates of the vertices in all of the second and subsequent frames is eliminated, making it possible to reduce memory storage capacity.

In the aforementioned invention, the co-ordinate transformation matrix can be stored beforehand in a memory table for each frame.

With the features described in the above, since the co-ordinate transformation matrix is stored beforehand in a memory table for each frame, the necessary co-ordinate transformation matrix can be acquired simply by reading the co-ordinate transformation matrix for transforming the memory table. Thus, 3D model deformation processing using clusters can be performed more rapidly.

In the aforementioned invention, the clusters can be managed by the attachment of identification information for specifying a cluster with which the vertex in question is associated, for each vertex. Since the clusters are managed by the attachment of identification information for specifying a cluster with which the vertex in question is associated, for each vertex, the clusters with which a vertex is associated can be specified from this identification information, so the clusters associated with each vertex can easily be specified. Thus, the clusters associated with each vertex can easily be specified, so 3D model deformation processing using clusters can be performed easily.

In the aforementioned invention, a weighting can be set in association with the identification information.

With the above features, since a weighting is set in association with the identification information for specifying clusters with which a vertex is associated, compared with directly setting the weightings at each vertex, the volume of data that needs to be stored can be reduced.

Furthermore, the present invention takes a form of a 3D model deformation method for deforming, using a video game device, a 3D model constituted by a plurality of polygons having vertices associated with clusters for specifying an object to be deformed, in correspondence with the drawing period, from data of each frame relating to a motion sequence, including: a matrix acquisition step wherein the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and a world co-ordinate calculation step wherein the video game device finds the world co-ordinates of the vertices in the certain frame using the weighting matrix, the co-ordinate transformation matrix, the inverse co-ordinate transformation matrix and the world co-ordinates of the vertices in the base frame.

In the aforementioned form of the invention, the 3D model deformation method for deforming, using a video game device, a 3D model constituted by a plurality of polygons having vertices associated with clusters for specifying an object to be deformed, in correspondence with the drawing period, from data of each frame relating to a motion sequence, includes: a matrix acquisition step wherein the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and a world co-ordinate calculation step wherein the video game device finds the world co-ordinates of the vertices in the certain frame using the weighting matrix, co-ordinate transformation matrix, inverse co-ordinate transformation matrix and the world co-ordinates of the vertices in the base frame.

That is, the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and finds the world co-ordinates of the vertices in the certain frame using the weighting matrix, co-ordinate transformation matrix, inverse co-ordinate transformation matrix and the world co-ordinates of the vertices in the base frame.

In this way, since the world co-ordinates of a vertex in any desired frame can be found from the weighting matrix and co-ordinate transformation matrix in any desired frame (certain frame) and the inverse transformation matrix and world co-ordinates of the vertex in a specified frame (base frame), deformation processing of a 3D model using clusters can be performed at high speed. Also, since there is no need to store beforehand in prescribed memory the world co-ordinates of the vertices in each frame, the memory storage capacity can be reduced. With the present invention, the world co-ordinates of vertices in any desired frame can be found from a weighting matrix and co-ordinate transformation matrix in any desired frame and an inverse co-ordinate transformation matrix and vertex world co-ordinates in a specific frame, so deformation processing of a 3D model using clusters can be performed in each drawing period in a video game and memory storage capacity can be reduced.

The present invention also takes a form of a video game device wherein a 3D model constituted by a plurality of polygons having vertices associated with clusters for specifying an object to be deformed, is deformed in correspondence with the drawing period, from data of each frame relating to a motion sequence, comprising: matrix acquisition means that acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, the co-ordinate transformation matrix, the inverse co-ordinate transformation matrix and the world co-ordinates of the vertices in the base frame.

In the present invention as described above, a video game device wherein a 3D model constituted by a plurality of polygons having vertices associated with clusters for specifying an object to be deformed, is deformed in correspondence with the drawing period, from data of each frame relating to a motion sequence, comprises: matrix acquisition means that acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and world co-ordinate calculation means that finds the world co-ordinates of the vertices in the certain frame using the weighting matrix, co-ordinate transformation matrix, inverse co-ordinate transformation matrix and the world co-ordinates of the vertices in the base frame.

That is, the video game device acquires a weighting matrix expressing weightings representing the degree of association of vertices in a certain frame with clusters associated with these vertices, a co-ordinate transformation matrix for transforming the local co-ordinate system of the vertices in the certain frame to a world co-ordinate system and an inverse transformation matrix constituting the inverse matrix of the co-ordinate transformation matrix for transforming the local co-ordinate system of the vertices in a base frame different from the certain frame to the world co-ordinate system; and finds the world co-ordinates of the vertices in the certain frame using the weighting matrix, co-ordinate transformation matrix, inverse co-ordinate transformation matrix and the world co-ordinates of the vertices in the base frame.

In this way, since the world co-ordinates of a vertex in any desired frame can be found from the weighting matrix and co-ordinate transformation matrix in any desired frame (certain frame) and the inverse transformation matrix and world co-ordinates of the vertex in a specified frame (base frame), deformation processing of a 3D model using clusters can be performed at high speed. Also, since there is no need to store beforehand in prescribed memory the world co-ordinates of the vertices in each frame, the memory storage capacity can be reduced.

With the present invention in the above form, the world co-ordinates of vertices in any desired frame can be found from a weighting matrix and co-ordinate transformation matrix in any desired frame and an inverse co-ordinate transformation matrix and vertex world co-ordinates in a specific frame, so deformation processing of a 3D model using clusters can be performed in each drawing period in a video game and memory storage capacity can be reduced.

This application is based on Japanese patent application serial no. 2001-326122, filed in Japan Patent Office on Oct. 24, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium storing an executable 3D model deformation program for configuring a video game device to function as:

a storage device storing data representing a 3D model of an object to be deformed, the 3D model including a plurality of polygons having vertices associated with clusters, the clusters being unrelated to a skeleton, the data representing frames relating a sequence of motions and which are sequentially displayed based on a drawing period, the frames including a base frame and a relevant frame wherein the 3d model is deformed relative to said base frame;

matrix acquisition means for acquiring:

a weighting matrix expressing weightings representing the degree of association of vertices in the relevant frame with clusters associated with these vertices, a co-ordinate transformation matrix for transforming co-ordinates of the vertices in said relevant frame represented by a local co-ordinate system to a world co-ordinate system, and an inverse transformation matrix constituting an inverse matrix of a co-ordinate transformation matrix for transforming co-ordinates of vertices in the base frame represented by the local co-ordinate system to co-ordinates of the vertices of the base frame represented by the world co-ordinate system; and world co-ordinate calculation means for calculating the world co-ordinates of the vertices in said relevant frame using said weighting matrix, said co-ordinate transformation matrix, said inverse co-ordinate transformation matrix and the co-ordinates of the vertices in said base frame represented in the world co-ordinate system.

2. The recording medium according to claim 1, wherein the 3D model deformation program further causes said video game device to function as summation means for a summation matrix obtained by:

finding products of said weighting matrix, said co-ordinate transformation matrix and said inverse co-ordinate transformation matrix for each of associated clusters of said clusters with which a given one of said vertices is associated, and adding the products;

wherein said world co-ordinate calculation means finds the world co-ordinates of said given one of the vertices in said relevant frame from the product of said summation matrix and the world co-ordinates of said given one of the vertices in said base frame.

3. The recording medium according to claim 1, wherein said base frame is the first frame relating to a motion sequence.

4. The recording medium according to claim 1, wherein said co-ordinate transformation matrix is stored beforehand in a memory table for each frame.

5. The recording medium according to claim 1, wherein for each of said vertices, said clusters are managed by attachment of identification information for specifying said associated clusters with which said given one of the vertices is associated.

6. The recording medium according to claim 5, wherein a weighting is set in association with said identification information.

7. A 3D model deformation method using a video game device, comprising:

storing data representing a 3D model of an object to be deformed, the 3D model including a plurality of polygons having vertices associated with clusters, the clusters being unrelated to a skeleton the data representing frames relating a sequence of motions and which are sequentially displayed based on a drawing period, the frames including a base frame and a relevant frame wherein the 3d model is deformed relative to said base frame;

operating said video game device to acquire:

a weighting matrix expressing weightings representing the degree of association of vertices in the relevant frame with clusters associated with these vertices, a co-ordinate transformation matrix for transforming co-ordinates of the vertices in said relevant frame represented by a local co-ordinate system to a world co-ordinate system, and an inverse transformation matrix constituting an inverse matrix of a co-ordinate transformation matrix for transforming co-ordinates of vertices in the base frame represented by the local co-ordinate system to co-ordinates of the vertices of the base frame represented by the world co-ordinate system; and operating said video game device to calculate the world co-ordinates of the vertices in said relevant frame using said weighting matrix, said co-ordinate transformation matrix, said inverse co-ordinate transformation matrix and the co-ordinates of the vertices in said base frame represented in the world co-ordinate system.

8. A video game device, comprising:

a storage device storing data representing a 3D model of an object to be deformed, the 3D model including a plurality of polygons having vertices associated with clusters, the clusters being unrelated to a skeleton, the data representing frames relating a sequence of motions and which are sequentially displayed based on a drawing period, the frames including a base frame and a relevant frame wherein the 3d model is deformed relative to said base frame;

matrix acquisition means for acquiring:

a weighting matrix expressing weightings representing the degree of association of vertices in the relevant frame with clusters associated with these vertices, a co-ordinate transformation matrix for transforming co-ordinates of the vertices in said relevant frame represented by a local co-ordinate system to a world co-ordinate system, and an inverse transformation matrix constituting an inverse matrix of a co-ordinate transformation matrix for transforming co-ordinates of vertices in the base frame represented by the local co-ordinate system to co-ordinates of the vertices of the base frame represented by the world co-ordinate system; and world co-ordinate calculation means for calculating the world co-ordinates of the vertices in said relevant frame using said weighting matrix, said co-ordinate transformation matrix, said inverse co-ordinate transformation matrix and the co-ordinates of the vertices in said base frame represented in the world co-ordinate system.

* * * * *